Patented Oct. 21, 1930

1,779,375

UNITED STATES PATENT OFFICE

LORIN B. SEBRELL, OF AKRON, OHIO, ASSIGNOR TO THE GOODYEAR TIRE & RUBBER COMPANY, OF AKRON, OHIO, A CORPORATION OF OHIO

METHOD OF VULCANIZING CAOUTCHOUC AND THE PRODUCT DERIVED THEREFROM

No Drawing.   Application filed September 13, 1927.   Serial No. 219,365.

My invention relates to the treatment of rubber and it has for its primary object the provision of a desirable material for accelerating the vulcanization of rubber products.

More specifically my invention has for one of its objects the provision of an accelerator which is composed of the reaction products of a mercaptothiazole and an aldehyde amine condensation product.

It has previously been known that mercaptothiazoles were powerful accelerators of the vulcanization of rubber products. It has also been known that the mercaptothiazoles might be caused to react with other substances, such as metallic salts, aldehydes, ammonia and amines, to produce accelerators which were, in many cases, superior to the mercaptothiazoles from which they were derived.

I have made the discovery that mercaptothiazoles, such as mercaptobenzothiazoles, may be caused to react with aldehyde amine condensation products, known as Schiff bases, to produce accelerators having very desirable properties. The general formula of a Schiff base is represented as follows:

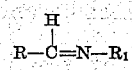

The radicals indicated by the characters R and $R_1$ may be either straight chain or cyclic hydrocarbons.

This class of compounds includes the reaction products of crotonaldehyde and aniline, (crotylidene aniline), acetaldehyde and aniline (ethylidene aniline), crotonaldehyde methylamine, propyl aldehyde and ethylamine, butyl aldehyde, aniline, butyl aldehyde toluidine, heptaldehyde aniline, heptaldehyde butyl amine, aniline cinnamic aldehyde, and numerous other hydrocarbon compounds which include the grouping indicated in the formula.

A specific example of a compound which falls within the scope of my invention is the crotonaldehyde aniline mercaptobenzothiazole reaction product. This material may be prepared as follows:

Intermix molecular quantities of the mercaptobenzothiazole and the crotonaldehyde aniline reaction products, and reflux them for a period of two hours or more. An exothermic reaction takes place during this period. Also, water and hydrogen sulphide are given off as is evident from the odor and the appearance of the condensate. The product obtained is a thick semi-solid which may be hardened to a resin-like state by distilling off a little aniline. The chemical formula of the reaction product is unknown. It is to be understood that this method of preparing the reaction product of the mercaptothiazole and the Schiff bases is of general application, and may be employed to manufacture various other materials of this class, which have been mentioned.

The material prepared according to the above described method may be incorporated into various rubber compounds. The following is a sample formula of a compound which insures excellent results:

| | Parts |
|---|---|
| Pale crepe rubber | 100 |
| Zinc oxide | 5 |
| Sulfur | 3 |
| Stearic acid | 1.50 |
| Accelerator | 0.50 |

The accelerative properties of the material prepared according to the method discussed were tested in the above formula and the results obtained are tabulated in the following tables.

TABLE I

*Mercaptobenzothiazole control*

| Cure | | 500% elong. kgs./cm² | 700% elong. kgs./cm² | Tensile strength kgs./cm² | Per cent elong. at break |
|---|---|---|---|---|---|
| Time in min. | Pounds pressure | | | | |
| 20 | 20 | 13 | 35 | 117 | 940 |
| 40 | 20 | 22 | 72 | 156 | 840 |
| 60 | 20 | 24 | 84 | 171 | 825 |
| 90 | 20 | 28 | 102 | 180 | 800 |

TABLE II

*Crotylidene aniline control*

| Cure | | 500% elong. kgs./cm² | 700% elong. kgs./cm² | Tensile strength kgs./cm² | Per cent elong. at break |
|---|---|---|---|---|---|
| Time in min. | Pounds pressure | | | | |
| 20 | 20 | No cure | | | |
| 40 | 20 | 8 | 12 | 30 | 885 |
| 80 | 20 | 10 | 30 | 68 | 870 |

TABLE III

Crotonaldehyde—Aniline—Mercaptobenzothiazole

| Cure | | 500% elong. kgs./cm² | 700% elong. kgs./cm² | Tensile strength kgs./cm² | Per cent elong. at break |
|---|---|---|---|---|---|
| Time in min. | Pounds pressure | | | | |
| 30 | 20 | 27 | 103 | 190 | 810 |
| 60 | 20 | 40 | 158 | 210 | 750 |
| 90 | 20 | 37 | 147 | 228 | 780 |

TABLE IV

Mercaptobenzothiazole solid ethylidene aniline

| Cure | | 500% elong. kgs./cm² | 700% elong. kgs./cm² | Tensile strength kgs./cm² | Per cent elong. at break |
|---|---|---|---|---|---|
| Time in min. | Pounds pressure | | | | |
| 15 | 20 | 19 | 73 | 145 | 860 |
| 30 | 20 | 30 | 110 | 165 | 755 |
| 40 | 20 | 34 | 132 | 200 | 780 |
| 60 | 20 | 38 | 147 | 210 | 770 |
| 90 | 20 | 40 | 155 | 205 | 755 |
| 120 | 20 | 41 | 160 | 210 | 750 |

Tables I and II respectively contain data obtained by testing samples in which the pure mercaptobenzothiazole and crotylidene aniline were used as accelerators. Table III contains data obtained from tests conducted upon samples containing the reaction product of mercaptobenzothiazole and the crotonaldehyde aniline condensation product. Table IV contains data obtained from the testing of rubber samples containing the reaction products of mercaptobenzothiazole and ethylidene aniline. Comparison of the data contained in Tables I and II with that contained in Tables III and IV clearly indicates that the reaction products of the mercaptothiazoles and the Schiff bases are materially more powerful accelerators than either mercaptothiazole or crotylidene aniline alone.

Since the product resulting from the combination of the thiazole and the Schiff's base is a more powerful accelerator than either of the original compounds, it is evident that a true chemical reaction takes place. The latter fact may be further demonstrated by extracting the final product with an alkali. The latter treatment would remove any unreacted mercaptobenzothiazole in its original state. Since no free mercaptobenzothiazole is thus obtained, it is clear that it has combined with the Schiff's base.

Although I have disclosed only the preferred embodiments of my invention and described those embodiments in detail, it will be apparent to those skilled in the art that the invention is not so limited, but that various minor modifications may be made therein without departing from the spirit of the invention or from the scope of the appended claims.

What I claim is:

1. A method of treating rubber which comprises heating a vulcanizable rubber compound containing a reaction product of mercaptobenzothiazole with a condensation product of a straight chain aldehyde and an amine having the formula $RNH_2$ in which R is a benzene group.

2. A method of treating rubber which comprises heating a vulcanizable rubber compound containing a reaction product of a mercaptobenzothiazole with a straight chain aldehyde aniline condensation product.

3. A method of treating rubber which comprises heating a vulcanizable rubber compound containing a reaction product of a mercaptobenzothiazole with the condensation product of aliphatic aldehyde and aniline.

4. A method of treating rubber which comprises heating a vulcanizable rubber compound containing a reaction product of mercaptobenzothiazole with the condensation product of crotonaldehyde and aniline.

5. A method of treating rubber which comprises heating a vulcanizable rubber compound containing a reaction product of mercaptobenzothiazole with the condensation product of an aliphatic aldehyde and aniline.

6. A method of treating rubber which comprises heating a vulcanizable rubber compound containing a reaction product of mercaptobenzothiazole with the condensation product of an unsaturated aldehyde and a benzene substituted amine.

7. The method of treating rubber which comprises heating a vulcanizable rubber compound containing a reaction product of mercaptobenzothiazole and crotylidene aniline.

8. A method of treating rubber which comprises vulcanizing it in the presence of a reaction product of mercaptobenzothiazole and crotylidene aniline.

9. A rubber product which has been vulcanized in the presence of a reaction product of mercaptobenzothiazole and crotylidene aniline.

10. A rubber product which has been vulcanized in the presence of a reaction product of mercaptobenzothiazole and a reaction product of aniline with an unsaturated aldehyde.

11. A method of accelerating the rate of vulcanization of rubber which comprises subjecting a vulcanizable mixture of rubber to heat in the presence of a reaction product of mercaptobenzothiazole, an aliphatic aldehyde containing not more than seven carbon atoms, and a basic benzene substituted amine.

12. A method of accelerating the rate of vulcanization of rubber which comprises subjecting it to heat in the presence of a reaction product of mercaptobenzothiazole, croton aldehyde and a benzene substituted amine.

13. A method of accelerating the rate of vulcanization of rubber which comprises heating a vulcanizable mixture of rubber in the presence of a reaction product of mercaptobenzothiazole, an aliphatic aldehyde containing not more than seven carbon atoms, and a primary aromatic amine containing a single benzene nucleus.

14. A method of accelerating the rate of vulcanization of rubber which comprises heating a vulcanizable mixture of rubber in the presence of a reaction product of mercaptobenzothiazole, an aliphatic aldehyde containing not more than seven carbon atoms, and an amine containing a single benzene nucleus.

15. A method of accelerating the rate of vulcanization of rubber which comprises subjecting the vulcanizable rubber compound to heat in the presence of a reaction product of mercaptobenzothiazole, croton aldehyde and aniline.

16. A method of accelerating the rate of vulcanization of rubber which comprises subjecting the vulcanizable rubber compound to heat in the presence of a reaction product of mercaptobenzothiazole, an aliphatic aldehyde containing not more than seven carbon atoms, and an amine selected from a group comprising aniline, toluidine, methyl amine and ethylamine.

17. A method of accelerating the rate of vulcanization of rubber which comprises subjecting a vulcanizable mixture of rubber to heat in the presence of a material formed by interacting mercaptobenzothiazole with a reaction product of an aliphatic aldehyde containing not more than seven carbon atoms and a benzene substituted amine.

18. A method of accelerating the rate of vulcanization of rubber which comprises subjecting a vulcanizable mixture of rubber to heat in the presence of a material formed by interacting mercaptobenzothiazole with a reaction product of an aliphatic aldehyde containing not more than seven carbon atoms and a primary benzene substituted amine.

In witness whereof, I have hereunto signed my name.

Signed at Akron, in the county of Summit and State of Ohio, this 12th day of September, 1927.

LORIN B. SEBRELL.